United States Patent [19]

deNeufville et al.

[11] Patent Number: 4,861,573

[45] Date of Patent: Aug. 29, 1989

[54] COMPOSITE COATING FOR ELECTROCHEMICAL ELECTRODE AND METHOD

[75] Inventors: John P. deNeufville, Mendham; Dalbir Rajoria, Glengardner, both of N.J.; Stanford R. Ovshinsky, Bloomfield Hills, Mich.

[73] Assignee: Voltaix, Inc., North Branch, N.J.

[21] Appl. No.: 121,262

[22] Filed: Nov. 16, 1987

Related U.S. Application Data

[60] Division of Ser. No. 872,730, Jun. 10, 1986, Pat. No. 4,707,422, which is a continuation-in-part of Ser. No. 769,857, Aug. 26, 1985, Pat. No. 4,624,902, which is a continuation of Ser. No. 507,752, Jun. 27, 1983, abandoned.

[51] Int. Cl.[4] .................. C01B 9/08; C01B 11/00; C01B 33/08; C01B 25/10
[52] U.S. Cl. ................... 423/464; 423/301; 423/341; 423/472
[58] Field of Search ............. 423/341, 472, 464, 301

[56] References Cited

PUBLICATIONS

Chemical Abstracts, vol. 106, No. 6, Feb. 9, 1987, Preparation and X-Ray and NMR structural studies of Lithium Zinc Fluoride 106:42789b 1986.

Comprehensive Inorganic Chemistry, Bailar et al., 7/31/83, p. 1466.
Structural Inorganic Chemistry, Wells, 1962.

Primary Examiner—John Doll
Assistant Examiner—Lori S. Freeman
Attorney, Agent, or Firm—Jenner & Block

[57] ABSTRACT

The present invention provides a coating for electrodes for use in electrochemical cells having an electrochemically active species and an electrolyte. The coating contains active species material and is selectively permeable allowing for the diffusion of the active species through the coating during operation of the cell while providing a substantially impervious barrier to the electrolyte. The coating optionally further includes a polymer layer over the active species containing coating or layer for maintaining the mechanical integrity of the active species layer.

Electrodes utilizing the coatings described herein may be used in primary and secondary cells over a wide range of operating temperatures to deliver better electrochemical performance even at room temperature.

Methods of making the coating and an apparatus for performing these methods on a continuous basis are disclosed.

A novel composition of matter is disclosed comprising lithium, silicon, and fluorine prepared by exposing lithium metal to $SiF_4$.

4 Claims, 13 Drawing Sheets

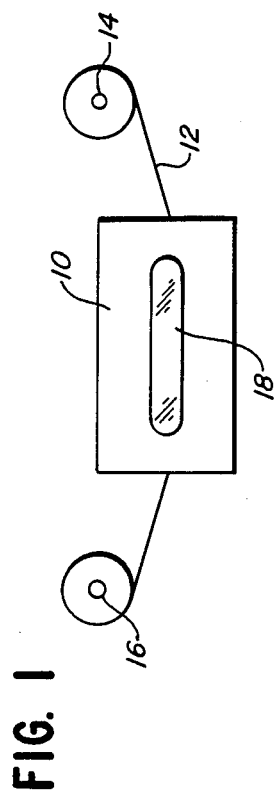
FIG. I
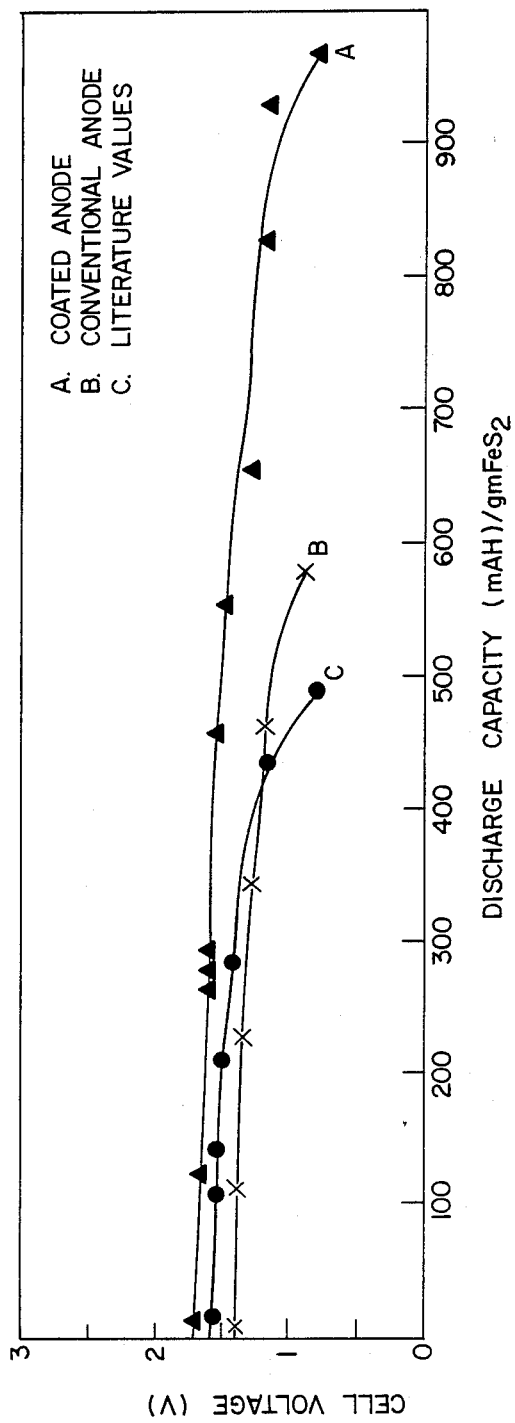
FIG. 2

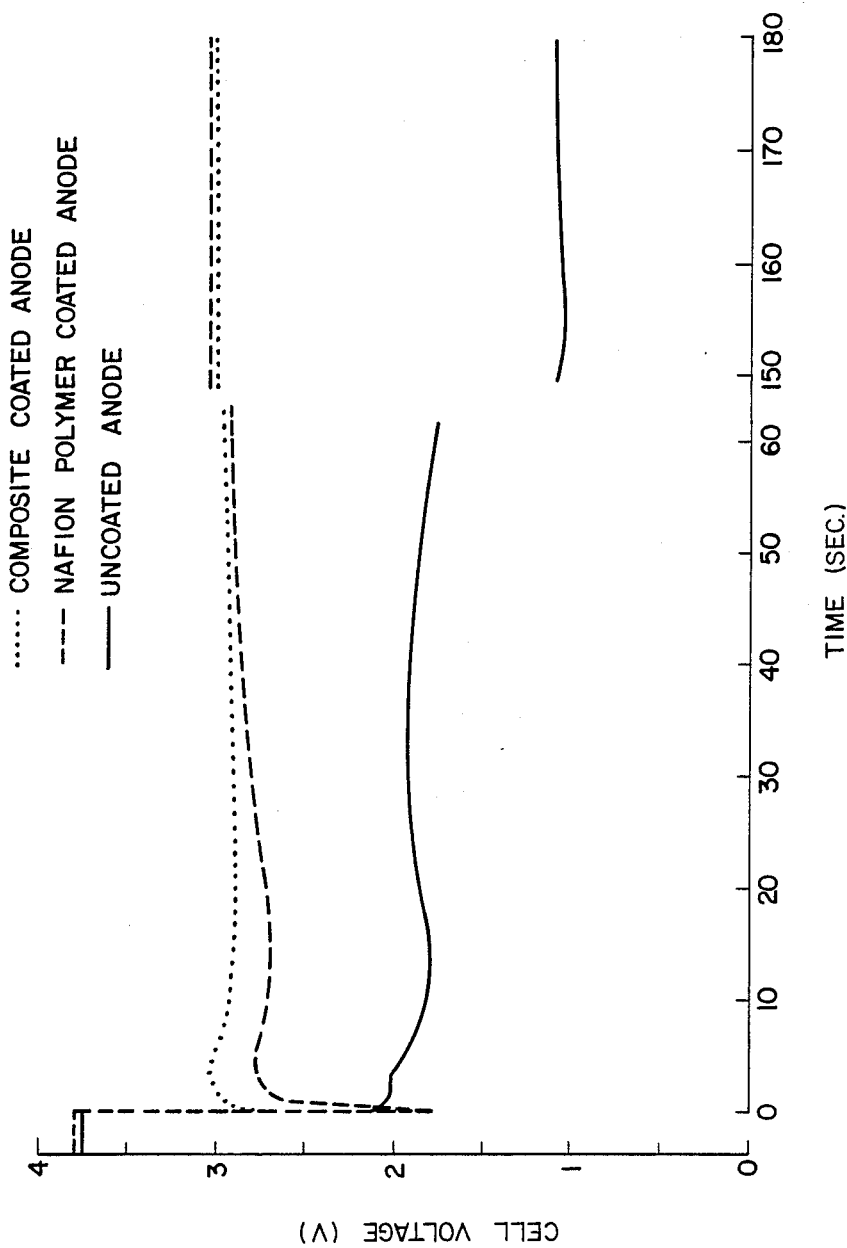

COMPOSITE COATING FOR ELECTROCHEMICAL ELECTRODE AND METHOD

This is a division of application Ser. No. 872,730 filed June 10, 1986, now U.S. Pat. No. 4,707,422, which is a continuation-in-part application of U.S. Ser. No. 769,857 now U.S. Pat. No. 4,624,902, filed Aug. 26, 1985, which is a continuation of U.S. Ser. No. 507,752, filed June 27, 1983, now abandoned.

BACKGROUND OF THE INVENTION

The present invention relates to electrochemical cells having an electrolyte and at least one electrode. More particularly, the invention relates to electrodes and electrode coatings for electrochemical cells. The coatings allow for the diffusion of an electrochemically active species through the coating during electrochemical release of the active species from the electrode or deposition of the active species onto the electrode while providing a substantially impervious barrier to the electrolyte. The electrode body having one of the coatings described herein may be made with various active materials and used in cells over a wide range of operating temperatures to deliver better electrochemical performance compared to the prior art.

In an electrochemical cell, chemical energy is converted to electrical energy with a reduction in the free energy of the system. In the course of the cell reaction, negative charge leaves the anode, travels through the external driven circuit, and re-enters the cell at the cathode. Thus, the cathode is the positive electrode and the anode is the negative electrode. By virtue of the established electromotive series, it is possible to select suitable cathodes and anodes to obtain a desired theoretical voltage. The ideal cell would give the theoretical voltage under continued, constant load, and the loss of free energy would manifest itself entirely as electrical energy outside the cell. However, this ideal is never attained in practice, because the internal resistance of the cell is not zero and the reactions within the cell never occur in a completely reversible manner. Moreover, incompatibility of the electrodes with each other or with the electrolyte, polarization, and other well-known problems prevent performance at theoretical values.

Certain materials are known to be more suitable than others for electrode materials. In particular, lithium has several properties which prove advantageous when used as an anode. Lithium in equilibrium with lithium ions in various solvent systems affords very negative potentials, and thus it is readily possible to achieve cell voltages greater than three volts, using appropriate oxide cathodic reactants, such as $MnO_2$. Because lithium has the lowest equivalent weight of any metal, the high cell voltages result in high energy per unit weight of cell. Lithium is reasonably stable in many nonaqueous electrolyte systems. This stability arises as a consequence of a chemical reaction between the lithium anode and the electrolyte, forming a passivating film at the interface which limits further reaction. Such films cause a number of problems which are discussed below.

Over the past decade, many battery companies and government laboratories have worked on the development of ambient temperature lithium batteries. Several primary lithium cells and at least one secondary lithium cell are now commercially available.

In the field of primary cells, the Li—$LiAlCl_4$/$SOCl_2$-C system has been extensively investigated. This system has received particular attention because of its relatively high open-circuit voltage of 3.6 volts and high energy density of 500 W-hr/kg. Such lithium primary systems demonstrate very high energy densities. For example, the Li/$SOCl_2$ system exceeds 16–20 Wh/in$^3$, which represents an energy density ten times greater than the Lechanche primary type. In addition to the questionable safety of the cell, however, there are other problems which hinder the ability of these systems to achieve their great potential for commercial success.

Using lithium as an anode material poses significant problems. Although lithium has been used successfully in aqueous electrolytes for very high drain rate batteries in military application, more conventional applications require the use of aprotic solvents to achieve reasonable shelf life and coulombic efficiency at low discharge rates. Use of these solvents causes handling and safety problems for such cells.

Lithium cells using a nonaqueous electrolyte have ruptured during use even though the cells were built to contain the gas generated by the electrochemical reaction between these components. Excessive internal heating, sometimes associated with inadvertent short circuits or over-discharging, is one reported cause of such rupture.

High drain-rate lithium cells have encountered problems with thermal runaway initiated by the exothermic reaction between lithium and the electrolyte, particularly an aqueous electrolyte. Since lithium has a relatively low melting point and its reactivity greatly increases upon melting, high operating temperatures must be avoided.

Lithium cells with liquid cathodes based on sulfur-containing electrolytes have a particular problem with gas generated from the degradation of the electrolyte. Since the cells are sealed to prevent leakage of the electrolyte, the potential for the cell to rupture is dramatically increased.

Lithium cells operating at ambient temperature using liquid cathodes based on organic or inorganic electrolytes tend to suffer from a shortcoming known as voltage delay. This term describes a temporary voltage depression on load when cells are tested after extended periods of storage, especially at high temperature. This phenomenon results from lithium directly contacting a soluble depolarizer to form a passivating film at the anode surface. The factors controlling this delay in activation are not well understood. The passivation film is at least partially responsible for the chronic low rate capability that nearly all lithium battery systems suffer from.

The voltage delay phenomenon also plagues other types of cells. For example, in a magnesium dry cell a passivation film forms on the magnesium anode to limit corrosion. The cell is then unable to deliver full operating voltage after it is placed under load.

Attempts to solve the voltage delay phenomenon have generally concentrated upon additives to the electrolyte. Although some additives have reduced the effect of the voltage delay phenomenon, the voltage and overall electrochemical performance of the cell is significantly decreased.

An inconvenient and expensive method of avoiding the voltage delay phenomenon is to place a small rechargeable cell, i.e., nickel cadmium cell, in parallel circuit with the passivated cell. The rechargeable cell provides the operating voltage until the passivated cell is capable of doing so.

Passivation films often form before the cell is assembled to limit the operating voltage of a cell unless current densities are used above a barrier value. For example, this problem is exhibited by titanium anodes used in electrolytic manganese dioxide processes. Sandblasting and chemical washes are treatments used in the attempt to remove the passivation film before the anode is used in the process.

Anode materials like lithium also are inherently rechargeable, i.e., lithium can be electrodeposited from lithium ion-containing electrolytes. One of the major problems limiting the successful development of rechargeable versions of lithium cells is the nature of the lithium deposit during the recharging of the cells. Past investigations indicate that lithium plating can occur in dendritic form, lowering the cell's utilization efficiency and ultimately shorting the cell.

Attempts to prevent deleterious dendrite formation include alloying the lithium with other metals like aluminum. Electrolyte additives also have been used to promote surface alloy formation. Although cycle life of the cell improves, the power density of the cell significantly decreases. Other attempts employ cell separators, such as permeable membranes, to act as physical barriers to dendritic growth. Although cell separators are initially effective, lithium dendrites can eventually penetrate the cell separators and establish transient or permanent electronic shorts.

In order to increase the voltage generated by devices utilizing lithium metal, coatings or layers of lithium compound compositions have been used on the lithium metal contained in these devices. For example, U.S. Pat. No. 3,528,856, granted to Ovshinsky, discloses a high temperature voltage and current generating device including a layer of lithium metal which is coated by various lithium compound compositions, i.e., lithium oxide, lithium nitride, etc. The lithium metal, as coated, is useful for generating voltage and/or electrical power in response to the application of heat. Open circuit voltages of the order of 1.5 to 2.5 volts were observed when the device was exposed to high temperature.

An example of a lithium-air device which generates voltage by utilizing lithium compounds as a coating is disclosed in U.S. Pat. No. 3,615,835, granted to Ovshinsky. Various lithium compounds were used as a solid coating over lithium metal. The device operated at room temperature and was activated by exposure to water moisture which penetrated the coating to contact the lithium metal layer.

SUMMARY OF THE INVENTION

In accordance with one aspect of the present invention, primary and secondary electrochemical cells having an electrolyte are provided that have at least one coated electrode containing an electrochemically active species. The active species may be lithium, for example. The coating of the electrode significantly improves cell performance and is particularly useful because it allows for diffusion of the active species through the coating to the electrolyte upon electrochemical release of the active species from the electrode or deposition of the active species onto the electrode and provides a substantially impervious barrier to the electrolyte.

Electrochemical cells in accordance with the invention exhibit a wide operating temperature range with improved cell capacity at various discharge rates, even at ambient temperatures. Improved rate capability for several cathodic reactants has also been achieved. With improved cell voltage and capacity, the cell is more efficient. In a more efficient cell, less power and heat dissipation takes place and thermal runaway and rupturing of the cell can be avoided.

The coating of the present invention provides protection against degradation of the electrode by the electrolyte or during storage and increases the shelf life of the electrode. Cells are less prone to rupture because electrolyte degradation is decreased and less gas is generated during cycling.

The coating includes a selectively permeable material which allows for the diffusion of the active species through the coating during operation of the cell while providing a substantially impervious barrier to the electrolyte. Thus, the coating is ionically conductive, at least for the active species.

The electrode coating can be a single layer of a non-metallic, inorganic material over the electrode body, for reducing passivation of the electrode body. This coating or layer is referred to herein as the active species coating or layer. The active species coating is ionically conductive and generally will comprise at least one element selected from hydrogen, lithium, sodium, potassium, magnesium and calcium and at least one electronegative element (Pauling electronegativity value of greater than 2.2). As used herein, Pauling electronegativity is as defined in *The Nature of the Chemical Bond*, 3rd edition, Cornell University Press, 1960. A preferred active species is lithium and a preferred electronegative element is fluorine. The coating contains one or more amphoteric elements (Pauling electronegativity of between 1.5 and 2.2). Suitable amphoteric elements are selected from aluminum, arsenic, germanium, gallium, molybdenum, phosphorous, silicon, tungsten and zinc.

The active species coating comprises a ternary non-metallic compound or alloy, which nonmetallic compound or alloy is a homogeneous phase having poor electronic conductivity (less than 10 ohm$^{-1}$cm$^{-1}$). The nonmetallic compound or alloy can exclusively make up the active species coating.

A primary function of the electrode coating is for protection of the electrode body. The active species coating should reduce or prevent passivation of the electrode body. As a result, the unwanted voltage delay phenomenon is greatly diminished and charge retention at elevated temperature is improved.

In accordance with a preferred embodiment, the coating over the electrode body further includes an outer polymer layer. The outer polymer or second layer should be either ionically conductive (at least for the active species) or soluble in the cell electrolyte to a degree sufficient to permit active species transfer through the polymer coating that remains undissolved. The polymer layer is deposited over the inner or active species coating previously described. Thus, in accordance with this preferred embodiment, a composite coating is provided on an electrode body that comprises first and second layers. An increase in cell capacity of about 20% as a result of a coated lithium electrode of the invention compared to anodes having only the polymer coating can be achieved, while minimizing voltage delay.

Generally, the second layer is located directly over the first or active species layer. A primary function of the second layer is to maintain the mechanical integrity of the first layer. The second layer may also provide some protection for the electrode body and more specifically, may provide a degree of protection from passivation.

The active species coating or layer can be relatively fragile and can be subject to damage. Commercial fabrication of electrochemical cells often subjects the electrode to handling during which a relatively fragile coating could be damaged. The damage could be in the form of cracks, delaminations, abrasions, or other breaches of the first layer. Also, charging and discharging can cause expansion and contraction of the electrode that may result in delamination, cracking or other damage to relatively fragile coatings. Operation of an electrochemical cell in severe service conditions, such as at high temperature or large temperature variations, can also damage fragile coatings.

The second layer which is a polymer coating will generally be chosen to withstand the conditions to which the coated electrode is subject during manufacture and operation, so that the mechanical integrity of the active species coating can be maintained.

The combination of the active species coating and the outer polymer layer appears to have a synergistic effect upon electrode performance, resulting in improvements that are not obtained if the active species or polymer layers are used alone and the combined benefits of using each alone would not provide the level of performance achieved by the composite coating of the present invention.

In one embodiment of the invention, an electrode is provided having a body comprising an electrochemically active species and a coating therein in accordance with the invention. The electrode is suitable for use in an electrochemical cell having an electrochemically active species and an electrolyte. The electrode body comprises material for storing said active species and subsequently discharging at least a portion of such stored active species to provide a supply of electrons. The electrode has a surface adapted to be operatively associated with the electrolyte in the cell. The electrode coating may be as previously described and thus, comprises an active species coating or layer, and optionally, a polymer coating over the active species layer. A preferred electrode body comprises lithium.

In another embodiment of the invention, an electrochemical cell is provided which includes an electrochemically active species and an anode, having an operative surface, for storing the active species and subsequently discharging at least a portion of such stored active species to provide a supply of electrons. A coating, which can be of the types previously described, is provided on the anode surface. The cell further includes a cathode for providing diffusion of the active species between the anode and the cathode during operation of the cell. The cathode operatively contacts the surface through the coating and includes an electrolyte. Lithium is one preferred active species. Other suitable active species include hydrogen, sodium, potassium, magnesium, and calcium. The present invention also contemplates applications of the inventive concept to both primary and secondary cells, and batteries having a plurality of such cells.

A method of making an electrode for use in an electrochemical cell having an electrochemically active species and an electrode includes the steps of providing an electrode body comprising material for storing said active species and subsequently discharging at least a portion of such stored active species to provide a supply of electrons. The electrode includes a surface adapted to be operatively associated with the electrolyte in the cell. The method further includes applying a coating according to the invention to the electrode surface. Preferably, application of the non-metallic, inorganic coating or coating portion to the electrode surface takes place by either solution deposition, vapor deposition, or rapid quench techniques.

The solution techniques include physically coating the selectively permeable material onto the electrode surface, chemically reacting the coating to the electrode surface, and reactively electroplating the coating onto the electrode surface. The vapor deposition techniques include sputtering, reactive sputtering, co-sputtering, reactive co-sputtering, glow deposition, vacuum evaporation, chemical vapor deposition, and reactive chemical vapor deposition. The rapid quench techniques include thermal spraying and plasma spraying.

The polymer layer of the coating, when present, can be formed by any suitable method for forming such layers. Suitable methods of application of the polymer layer include, for example, spraying, dipping, glow discharge polymerization and solution deposition.

The present invention also provides an apparatus for performing the methods of making the coated electrodes of the invention on a continuous basis. In accordance with this embodiment, the electrode is made from a roll of a web of substrate with one or more electrode-forming regions thereon. The apparatus includes structure for unrolling the substrate substantially continuously into an application chamber, the chamber including at least one depositing region therein. The apparatus further includes depositing apparatus for depositing a coating onto at least some of said one or more electrode-forming regions. The depositing apparatus is positioned in the application chamber. Preferably, the application chamber may be a solution bath for the solution techniques described above; a reactive chemical vapor deposition chamber; a vacuum chamber for the vapor deposition techniques described above; or, apparatus for melting the selectively permeable material for subsequent depositing and quenching onto a substrate such as with thermal or plasma spraying optionally followed by suitable apparatus for depositing the polymer layer.

In accordance with another aspect of the present invention, a composition of matter including the elements lithium, fluorine, and silicon also is provided. The composition of matter exhibits characteristic absorption bands in the infrared region of the spectrum at the frequencies expressed in reciprocal centimeters according to FIG. 5 and the X-ray diffraction spectrum according to FIG. 6. The composition of matter is prepared by exposing lithium metal to a mixture of 18 percent $SiF_4$ in argon at one atmosphere at a temperature of 125° C. Another composition of matter is prepared by exposing potassium or sodium to a mixture of 18 percent $SiF_4$ in argon at one atmosphere at a temperature of 125° C.

BRIEF DESCRIPTION OF THE DRAWINGS

FIG. 1 is a block diagram of one illustrative apparatus for performing the methods of making the coated electrodes of the invention on a continuous basis;

FIG. 2 is a graph of cell voltage versus capacity for a cell having a coated electrode of the invention compared to conventional, uncoated electrodes of the prior art;

FIG. 14 is a graph of cell voltage versus time for a composite coated anode of the invention including a Nafion polymer layer compared to a Nafion polymer coated anode and an uncoated anode.

DETAILED DESCRIPTION OF THE PREFERRED EMBODIMENTS

Figure 3:
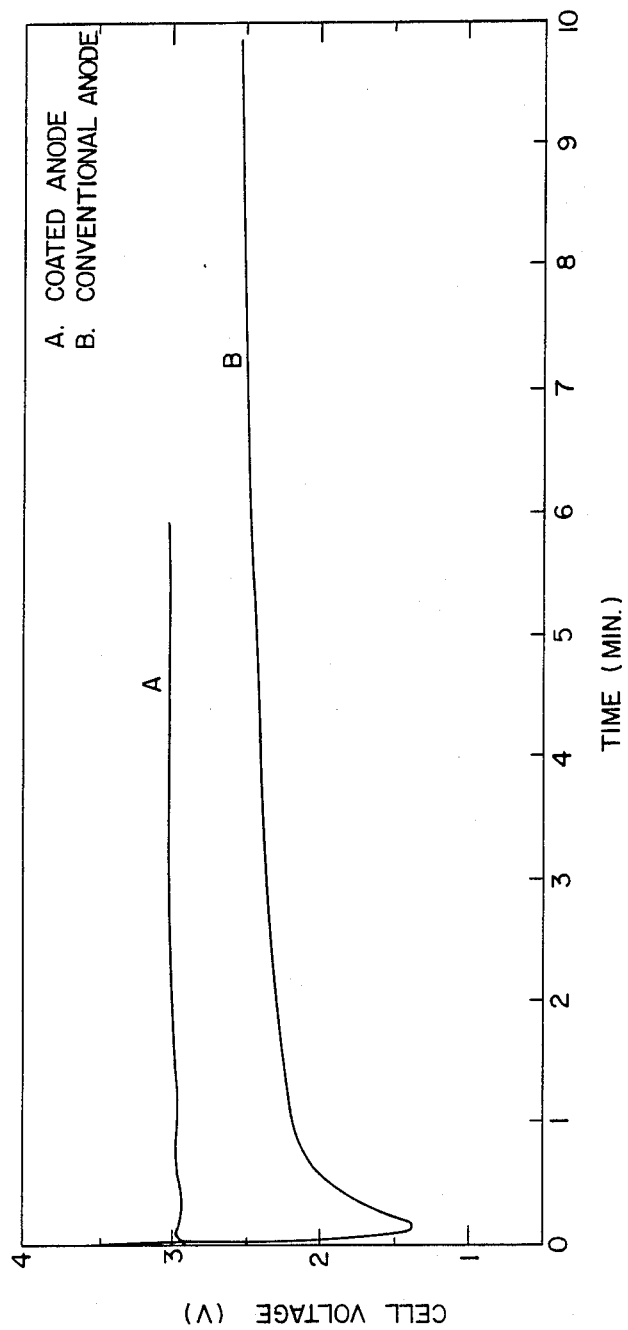
FIG. 3 is a discharge curve plotting cell voltage versus time for a coated lithium anode of the invention in SOCl₂ electrolyte compared to a conventional, uncoated anode of the prior art demonstrating the elimination of the voltage delay phenomenon.

The present invention provides a coating for an electrode which is used in electrochemical cells having an electrochemically active species and an electrolyte. The coating allows diffusion of the active species away from the electrode and into the electrolyte during the discharge stage of the electrochemical reaction In secondary electrochemical cells, the diffusion of the active species through the coating is reversible. The preferred embodiment coating is a composite coating that comprises first and second layers or coatings. The first coating or layer, which is inorganic and applied over the electrode body, provides a substantially impervious barrier to the electrolyte. The second layer is over the first layer and is a polymer material.

The composition of the inorganic coating or layer comprises an active species and at least one electronegative element. This coating or layer, which can be referred to as an active species coating or layer, may also be a compositionally disordered material with single or multiple phases, and it may be applied through a variety of solution or vapor deposition techniques.

The polymer overlayer coating material can be chosen from a variety of polymers, including polymers that are soluble or insoluble in the cell electrolyte. Suitable polymers include, for example, cyanoacrylate polymers, silicone polymers, thermoplastic polymers based on paraxylylene (also known as parylene), perfluorosolfonic acid polymers, such as Nafion, a trademark of the E. I. Du Pont de Nemours & Co., and vinyl polymers or copolymers, including vinyl chloride-vinyl acetate copolymers and polyvinyl chloride polymers. Vinyl chloride-vinyl acetate copolymer is commercially available from Union Carbide under the trade designation VYHH. If the chosen polymer layer is insoluble in the cell electrolyte, the polymer is also chosen to be ionically conductive, at least for the active species of the electrode, so that the active species can pass through the polymer layer. If the chosen polymer is soluble in the cell electrolyte, it should be chosen to avoid any undesirable effect on the cell and its components.

Various cathode systems, and more particularly, electrolytes, may be used in an electrochemical cell containing the coated electrode in accordance with the invention. The coatings of the invention provide greatly improved specific capacities, cell voltages, rate capabilities, and other electrochemical cell characteristics.

The coatings of the present invention provide a selectively permeable material which allows an active species to diffuse through the coating during operation of the cell. The term electrochemically active species is used to generally denote the form which the active material of the electrode takes upon electrochemical operation of the electrode in a cell. For example, in a lithium anode cell, the active species are Li+ ions or a complex ion of lithium. Simultaneously, the coating functions as a barrier to prevent diffusion of the electrolyte through the coating so that the electrode does not come in direct physical contact with the electrolyte. Thus, the coating is selectively permeable to the diffusion of the particular active species and impervious to the diffusion of the electrolyte.

The diffusion of the active species need only be in one direction in a primary cell, i.e., from the electrode. The inventive coating may also be used on electrodes for and in secondary cells. Upon discharge of the electrode, the active species diffuses away from the electrode and into the electrolyte. Upon charging of the electrode, the active species diffuses from the electrolyte to the electrode. Thus, the diffusion of the active species through the coating in a secondary system is reversible.

For prolonged operational life, at least the inorganic layer of the coating must be substantially impervious to degradation by the electrolyte. Although the active species diffuses through the coating during the electrochemical reaction, the inorganic coating itself does not react with the electrolyte so that the structure of the inorganic coating remains intact. Thus, the coating interposes a physical barrier between the electrode body and the electrolyte. In embodiments where the polymer layer is not soluble in the electrolyte, the polymer layer also provides a physical barrier between the electrode body and the electrolyte. Such a result may also occur where the polymer layer, although soluble, does not completely dissolve in the cell electrolyte. This could occur where the electrolyte is saturated with the polymer and a portion of the polymer layer remains on the electrode, such as in a starved cell, for example.

The composition of the active species coating or first layer which is a selectively permeable material, includes the active species material and at least one electronegative element. The term electronegativity refers to the attraction of nuclei for electrons, and comparisons between the electronegativity of elements are made with Pauling's electronegativity series. An electronegative element has a Pauling electronegativity value greater than 2.2. Suitable electronegative elements are fluorine, iodine, bromine, chlorine, sulfur, nitrogen, and oxygen. Compounds of these elements also may be suitable. Preferably, the active species coating or layer incorporates lithium with either fluorine, nitrogen or iodine.

The active species coatings or first layer of the composite coatings may include carbon or preferably at least one amphoteric element The term amphoteric is used to denote an element with a Pauling electronegativity value ranging between 1.5 and 2.2. Carbon need not be in elemental form; organic compounds such as polymers are suitable. Silicon and aluminum are preferred amphoteric elements. Other suitable amphoteric elements are selected from arsenic, germanium, gallium, molybdenum, phosphorous, tungsten, and zinc. The amphoteric element need not necessarily be in elemental form, and thus, compounds of these elements also may be used.

Preferably, the active species coating or first layer incorporates fluorine as the electronegative element, lithium as the active species (for a lithium electrode), and silicon as the amphoteric element. A highly preferred active species coating comprises the compound $Li_4SiF_4$. Other preferred active species coatings comprise the active species, particularly lithium, and the following combinations of elements: P and F; Ge and F; W and F; Mo and F; P, O and F; and As and F. The active species coating may be composed of either stoichiometric or nonstoichiometric material or combinations thereof.

Usually, the composition of the active species coating is in the range of from about 20% to about 50% active species, about 20% to about 70% electronegative element(s) and about 5% to about 60% amphoteric element(s), all on an atomic basis. Generally, more suitable compositions will be in the range of 20-50% active species, 40-70% electronegative element(s) and 5-15% amphoteric element(s), all on an atomic basis. Preferably, the composition of the active species coating is $Li_xMF_x$ or $Li_{x+2y}MF_xO_y$ where M is the amphoteric element. Often the values of x and y will be chosen so that a volatile amphoteric element fluoride such as $SiF_x$ ($x=4$) or $PO_yF_x$ ($x=3$ and $y=1$) can be reacted with the lithium to produce the active species coating. In accordance with the invention, a novel composition of matter is provided having the stoichiometry $Li_xMF_x$ where M is an amphoteric element from the group Al, As, Ga, Ge, Mo, P, Sb, Si, Tl, W and Zn and x is an integer from 1 to 6 corresponding to a valence of M. Suitable amphoteric element fluorides can be chosen from $AlF_3$, $AsF_3$, $AsF_5$, $GaF_3$, $GeF_4$, $MoF_6$, $PF_3$, $PF_5$, $SbF_3$, $SbF_5$, $SiF_4$, $TlF$, $TlF_3$, $WF_6$ and $ZnF_2$, for example.

The active species coating or layer also may contain an electropositive element incorporated in the selectively permeable material. An electropositive element has a Pauling electronegativity value less than 1.5. The electropositive element is a different element from the active species. Suitable electropositive elements include lithium, sodium, potassium, magnesium and calcium. Adding an electropositive element increases the ionic diffusion rate of the active species through the coating. Other means for increasing the diffusion rate of the active species through the coating are also contemplated.

The diffusion coefficient of the active species through the composite coating is preferably greater than about $10^{-10}$ cm$^2$/sec.

To enhance the electrochemical characteristics of the electrode, the diffusion coefficient of the active species through the active species coating or layer is also preferably greater than about $10^{-10}$cm$^2$/sec. More importantly, the active species coating or layer of the invention usually has an ionic conductivity greater than about $10^{-8}$ohm$^{-1}$cm$^{-1}$ and preferably greater than $10^{-6}$ohm$^{-1}$cm$^{-1}$. The conductivity of the composite electrode coating should also usually be greater than about $10^{-8}$ohm$^{-1}$cm$^{-1}$ and preferably greater than about $10^{-6}$ohm$^{-1}$cm$^{-1}$.

The active species coating or layer may have a structure which is either a single phase crystalline material, or a compositionally disordered material. Such disordered materials have tailor-made local chemical environments which are designed to improve the electrochemical performance of a coated electrode by increasing the density and/or reducing the barrier height of the diffusivity sites for the active species of the electrode. The diffusivity sites must be selective, so that the electrolyte will not be diffused through the coating.

Disordered materials are ideally suited for manipulation since they are not constrained by the symmetry of a single phase crystalline lattice or by stoichiometry. By moving away from materials having such restrictive single phase crystalline symmetry, it is possible to accomplish a significant alteration of the local structural chemical environments to selectively enhance and control the active species diffusion coefficient of the inventive materials.

The types of disordered structures which provide the local structural chemical environments for the enhanced selective diffusion characteristics contemplated by the invention include multicomponent polycrystalline materials lacking long-range compositional order, microcrystalline materials, amorphous materials or multiphase materials containing both amorphous and crystalline phases. The following list provides a classification of the spectrum of disordered structures described by the present invention:

1. Multicomponent polycrystalline materials lacking long-range compositional order.
2. Microcrystalline materials.
3. Mixtures of polycrystalline and microcrystalline phases.
4. Mixtures of polycrystalline or microcrystalline and amorphous phases.
5. Amorphous materials containing one or more amorphous phases.

In carrying the present invention into practice, the coatings described herein may be used on the surface of an electrode adapted to be operatively associated with an electrolyte in an electrochemical cell. The coated electrode may include the active species as part of the coating before operation of the cell diffuses the active species through the coating.

The electrode includes active material, described hereinafter, for storing the active species and subsequently discharging at least a portion of the stored active species to provide a supply of electrons. The electrode may initially be in a charged or uncharged state. In a charged state, the active species is initially stored with the coated electrode. In an uncharged state, the active species is initially released from a counter electrode or from the electrolyte upon operation of the cell and diffuses through the coating to deposit onto the coated electrode.

The active material of an electrode that can be used with the coatings of the present invention includes at least one element selected from the group consisting of Group IA, Group IB, Group IIA, Group IIB, and mixtures of the aforesaid elements with other substances such that the aforesaid elements can be electrochemically released from the mixture. Preferably, the active material of the electrode is the metal lithium. Advantageously, other Group IA elements such as sodium and potassium are suitable. Suitable Group IIA elements are magnesium and calcium. A second preferred active material is a hydrogen storage material; other means for charging by absorbing and storing hydrogen and subsequently discharging at least a portion of the stored hydrogen to provide a supply of electrons also are contemplated.

The uncoated electrode may consist entirely of the active material or the active material can be deposited on a supporting structure which, in turn, can be constructed of materials such as copper, steel, nickel, carbon, etc., which are advantageously electronically conductive but which are not the source of the active species. In some instances, the electrode may incorporate alloys, compounds or solutions containing the active material provided that the alloys, compounds or solutions meet the requirement that they are electronically conductive and are capable of electrochemically releasing the active species which is to be transported into the electrolyte.

A general concept of the invention is to substitute a designed barrier with the characteristics described herein in place of the passivation layer spontaneously formed by the reaction of the electrode and the electrolyte or environment which deleteriously affects many electrode systems. As applied to the electrode, the active species coating or layer should be of an effective thickness and uniformity to reduce or prevent the formation of a passivation layer on the electrode surface which limits the electrochemical release of the active species.

The electrode coating should be uniform so that areas of the electrode surface are not exposed directly to the electrolyte. Otherwise, a passivation layer may form over such uncoated areas and decrease the electrochemical performance of the electrode. Furthermore, direct contact between the electrolyte and electrode provides an area for degradation of the electrode.

The thickness of the coating is variable and must be sufficient to act as a substantially impervious barrier to the diffusion of the electrolyte to the electrode. For example, the active species coating or layer thickness will usually be in the range of from about 100 angstroms to about 50,000 angstroms. Preferably, the thickness of the active species coating or layer is not less than about 500 angstroms and not more than about 20,000 angstroms. More preferably, the thickness of active species coating is about 10,000 angstroms and preferably has ionic conductivity greater than $10^{-6}\text{ohm}^{-1}\text{cm}^{-1}$ and/or a diffusion coefficient of the active species greater than $10^{-10}\text{cm}^2/\text{sec}$. As used herein, the term "ionic conductivity" means the active species ionic conductivity of material in contact with electrolyte containing a dissolved active species compound such as a salt or acid.

The desired thickness of the polymer layer depends on the type of polymer used. For polymers that are insoluble in the electrolyte (such as Nafion or parylene polymers, for example), the thickness will usually be in the range of from 500 angstroms to about 10,000 angstroms, and preferably about 2,500 angstroms. For soluble polymers, the thickness can be greater because it can be anticipated that a portion of the polymer coating will dissolve during cell assembly and use. Usually, the thickness will be in the range of from about 500 to about 50,000 angstroms or more, and preferably about 5,000 angstroms. The ionic conductivity of the polymer layer during cell operation is preferably about $10^{-6}\text{ohm}^{-1}\text{cm}^{-1}$ or greater.

The thickness and ionic conductivity of the entire electrode coating (for example, the active species and polymer layers) should be selected in such a way such that the overall ionic resistance is no more than about 1,000 ohms/cm².

The coated electrode described above may be used as the anode in an electrochemical cell. Such anode stores the active species and subsequently discharges at least a portion of the stored active species to provide a supply of electrons. The anode includes an operative surface over which the coating is applied or at which the coating is formed.

Using the coated electrode in an electrochemical cell requires a cathode for providing diffusion of the active species between the anode and the cathode during operation of the cell. The cathode operatively contacts the surface through the coating. The present invention is not limited to a particular structure nor material used for the cathode.

The cathode structure itself need not necessarily consist of a cathodic reactant. The structure may be made of materials such as carbon, copper, nickel, zinc, silver, etc., upon which or in which the cathodic reactant is deposited or impregnated. Advantageously, the cathode structure consists entirely of the cathodic reactant when it displays significant electrical conductivity. Preferably, the cathodic reactant is not admixed or diluted with an electrochemically inactive material.

The cathodic reactant may itself be dissolved or suspended directly in the electrolyte. In such an embodiment, the cathode structure includes a current collector spaced from the anode. Often, the use of a separator is unnecessary when the electrolyte itself functions as a separator.

The cathode includes any type or kind of cathodic reactant. The cathodic reactant may be a pure compound or any combination of compounds, a liquid or solid, and used with a liquid or solid electrolyte. Preferably, the cathodic reactants used with a lithium anode coated by the invention include: $FeS_2$, $Fe_2O_3$, $TiS_2$, $(CG_x)_m$, and $SOCl_2$. Other suitable cathodic reactants include, but are not limited to: $MnO_2$, $MoO_3$, $V_6O_{13}$, $V_2O_5$, $CuO$, $Ag_2CrO_4$, $CuS$, $SO_2$, $SO_2Cl_2$, $I_2$, $Br_2$, $PbI_2$, $PbS$, and $S$.

An electrolyte useful in practicing the present invention must be chemically impervious to the inventive coating and cathode materials. The electrolyte must permit migration of ions from the coated anode to the cathodic reactants during the discharge of a primary or secondary cell, and vice versa, during the charge cycle of a secondary cell. The term electrolyte as used is the application herein refers individually to either an ionic conductive component or a solvent or the combination of both and does not include the active species or electrode coating.

Suitable electrolytes include both aqueous and nonaqueous, alkaline and acidic, organic and inorganic materials. A wide range of aprotic solvents and their mixtures can be used as nonaqueous electrolytes with the above-described anodes. Preferably, these nonaqueous solvents include dioxolane, dimethyl formamide, methyl formate, and propylene carbonate. Other suitable solvents include water, butyrolactone, dimethoxyethane, ethylene carbonate, sulfolane, and tetrahydrofuran.

Other suitable electrolytes include an ionizable salt or acid having at least one cation moiety being identical to the active species selected from the group of elements, lithium, sodium, potassium, calcium, magnesium and hydrogen and at least one anionic moiety selected from the group consisting of halides, hydroxides, sulfates, nitrates, fluoroarsenates, borofluorides, borochlorides, phosphofluorides, thiocyanates, and perchlorates.

For use with a lithium anode, preferred electrolytes include salts of lithium perchlorate, lithium tetrafluoroborate, lithium aluminum tetrachloride, and lithium hexafluorarsenate.

The concentration of the salt in the electrolyte is determined by the electrolyte conductivity and chemical reactivity. However, in most instances, concentrations between about 0.1 moles per liter and 5 moles per liter of the ionizable salt in the solvent are preferred. In addition to the foregoing electrolytes, it should be noted that some electrolytes may be used in the pure state as in the form of a solid.

The present invention contemplates several methods of applying the active species coating or layer to the electrode surface. These methods may be used to successively deposit several layers of the active species coating. The active species coating may be formed by atomistic, molecular, particulate, or bulk deposition techniques. Although particulate and bulk techniques are often inexpensive by comparison, atomistic or molecular deposition techniques allow for greater control over the local chemical environments to structure a selectively permeable material with the characteristics described above. Generally, three classes of methods for applying the coating can be described. This classification, however, is presented to better understand the contemplated invention and is not meant to be a limitation. These classes are solution deposition, vapor deposition and rapid quench deposition. As used in the following discussion, the term selectively permeable material refers generally to some or all of the individual elements, compounds, or components comprising the coating.

The first class of methods for applying the active species coating or layer to an electrode surface includes preparing a solution of a solute and the selectively permeable material. This solution is applied to the electrode surface. The selectively permeable material is then deposited onto the electrode surface to form the coating.

The step of depositing the active species coating or layer onto the electrode surface may be done with or without an electrical bias. In one embodiment, the solute may be dried from the solution to leave the selectively permeable material as a coating on the electrode surface. In a second embodiment, subjecting the electrode to an electrical bias plates certain components of the selectively permeable material onto the electrode surface where they may react. Thus, the coating is reactively electroplated. In a third embodiment, the certain components of selectively permeable material chemically react with the electrode surface to form the coating.

The first class of methods for applying the active species coating or layer also includes adding the selectively permeable material directly to the electrolyte contained in the electrochemical cell with the electrode. Once the electrode surface is placed in operative contact with the electrolyte, the selectively permeable material reactively deposits onto the electrode surface to form the coating. The deposition of the selectively permeable material onto the electrode surface once it is placed in operative contact with the electrolyte may take place by either a chemical reaction between the selectively permeable material and the electrode surface, or by plating certain components of the selectively permeable material onto the electrode surface by subjecting the electrode to an electrical bias so as to reactively electroplate the coating.

A second class of methods of applying the coating to the electrode can be generally defined as vapor deposition. The depositing of the selectively permeable material is accomplished by a number of conventional techniques which are carried out in a vapor environment. These techniques include sputtering, reactive sputtering, co-sputtering, reactive co-sputtering, glow discharge, vacuum evaporation, chemical vapor deposition (CVD), and reactive chemical vapor deposition. The chemical vapor deposition techniques in particular generally produce a coating having a surface roughness of a factor of 10 or more than the surface roughness of the electrode material, such as lithium foil. The active species coating thus couples the electrolyte to the electrode via a high surface area coating, which is advantageous for electrochemical use. Such relatively rough surfaces can be susceptible to breakage and delamination, and as a result, the polymer layer is believed to be particularly effective with such active species coatings. While the polymer layer generally reduces the surface area, the interface between the electrode material and the active species coating material remains high.

A third class of methods of applying the coating to the electrode includes rapid quench techniques where the selectively permeable material is melted and deposited onto the electrode surface. As the selectively permeable material is deposited, it is rapidly quenched. A compositionally disordered material may be formed. Preferably, thermal or plasma spraying is used for this class.

The methods of preparing the active species coating or layer described herein include reactively electroplating and reactive chemical vapor deposition. It is believed that such reactions are advantageously promoted by using the high mobility of the active species in the coating. Thus, the active species is diffused through the coating during its formation to react with other components of the selectively permeable material at the interface between the growing coating and the reactive solution or vapor.

Suitable CVD techniques include exposing lithium, or some other active material, to materials such as $AlF_3$, $AsF_3$, $AsF_5$, $GaF_3$, $GeF_4$, $MoF_6$, $PF_3$, $PF_5$, $POF_3$, $SbF_3$, $SbF_5$, $SiF_4$, $TlF$, $TlF_3$, $WF_6$ and $ZnF_2$ in the presence of heat and usually in an atmosphere composed of, other than the reactants, inert gas such as argon or helium. Sputtering techniques would include the use of suitable target compositions and, if reactive sputtering, the desired reactive gas in the sputtering atmosphere.

Referring to FIG. 1, a block diagram of a system apparatus is illustrated for making coated electrodes of the invention, as described above. Although these processes could be performed on a batch basis, continuous processing is preferred. Thus, the vapor deposition, solution deposition, and rapid quench processes described above may be performed in an application chamber 10. A roll of a web of substrate material 12 is fed off of a payout reel 14 into and through the chamber 10 where the coating is deposited onto at least some of the one or more electrode-forming regions on the substrate 12. After the electrode-forming regions have been coated, the web moves to a take-up reel 16. The deposition process may be observed through a viewing port 18 or through monitoring and control instrumentation.

Other structure or apparatus may be provided for unrolling the substrate substantially continuously into the application chamber 10. At least one depositing region is located in the application chamber 10.

The method for depositing the active species coating or layer may include filling the application chamber 10 with a solution to operatively contact the electrode-forming regions as the substrate 12 moves through the chamber 10. The solution includes some or all of the components of the selectively permeable material for the active species coating and a solute. If all of the components are present in the solute, then the coating may be deposited on said electrode-forming regions by providing means for drying the solute from the solution. In a second embodiment, means for subjecting the electrode-forming regions to an electrical bias may plate certain components of the selectively permeable material onto the substrate 12 where they react with the active species on the surface of the electrode so as to reactively electroplate the coating. In a preferred third embodiment, means are provided for chemically reacting dissolved components of the selectively permeable material with the active species at the electrode surface to form the coating.

The application chamber 10 may also be evacuated so that the means for depositing the selectively permeable material on the electrode-forming regions may include vapor deposition methods. The vapor deposition techniques contemplated by the invention are referred to by those skilled in the art as: sputtering, reactive sputtering, co-sputtering, reactive co-sputtering, glow discharge, vacuum evaporation, chemical vapor deposition, and reactive chemical vapor deposition.

The apparatus for depositing the active species coating or layer on said electrode-forming regions may also include apparatus for melting the material, apparatus for depositing the material onto the electrode-forming regions, and apparatus for quenching the material. Thus, the substrate 12 and application chamber 10 can be used in a fashion similar to a thermal or plasma spraying apparatus.

After application of the active species coating or layer, the polymer layer, if present, is deposited thereover, utilizing suitable apparatus (not shown) and techniques which are well known in the art. For example, the polymer layer can be formed by spraying, dipping, solution deposition and glow discharge polymerization.

EXAMPLE I

Comparative tests were made between cells using coated lithium anodes of the invention and conventional, uncoated lithium anodes. A coating was prepared on a scraped lithium foil mechanically positioned on an anode platen by reactively co-sputtering an alloy of lithium and silicon (about 50 weight percent of each) in an atmosphere of about 2% fluorine/98% argon using a Mathis R.F. Sputtering Unit. The anode platen was cooled by a liquid nitrogen bath during the sputtering. The lithium foil was supplied by Foote Mineral Company and was 99.9% pure. The area and thickness of the foil were about 0.1875 sq. in. and 0.10 in., respectively. The thickness of the coating on the anode was about 1000 angstroms.

A cathode for the cell was made with about 100 mg. of finely ground natural iron pyrite ore ($FeS_2$). Twenty percent XC-72 carbon from the Cabot Corporation and 3% dry powdered Teflon were blended with the $FeS_2$ powder. The mix was pressed at about 1,200 psi into a nickel grid with tabs for electrical contact. The cathode formed was then cured at 190° C. to bond the mix. The active materials were balanced in such a way that a stoichiometric excess of lithium was present compared to the discharge capacity of the $FeS_2$.

Filter paper was used as a separator in the cell. The cell was assembled with the separator sandwiched between the anode and cathode. The electrolyte, 1M $LiClO_4$ in 1, 3 dioxolane, was added and the test cell mounted in a glass test vessel equipped with a standard taper joint and with glass to metal throughputs for electrical contact.

A second cell was constructed in an identical manner as described above, except that the anode was conventional, uncoated lithium foil.

FIG. 2 compares the test results from these two cells, plotting cell voltage vs. discharge capacity at room temperature. A third set of data, published in the article entitled "Ambient Temperature Secondary $Li/FeS_2$ Cells," Advanced Secondary Batteries Session, pp. 201–204, by Newman et al., also is presented in FIG. 2 for comparison. The third set of data is for a cell constructed in a similar manner as described above, except that a conventional, uncoated lithium anode is used with $LiB(C_6H_5)_4$-dioxolanedimethoxyethane as the electrolyte.

The data clearly demonstrate that the cell capacity nearly doubled. The theoretical capacity of the cell was calculated at about 880–900 mAh/g of $FeS_2$. The capacity of the cell achieved using the coated anode was close to the theoretical capacity, thus indicating much more effective utilization of the active materials. The open circuit voltage also was considerably improved over the conventional, uncoated anodes.

EXAMPLE II

A comparison of cells was made using a lithium anode coated in accordance with the present invention against a conventional, uncoated lithium in various electrolytes. Two cells were prepared as described in Example I, except for using a different electrolyte. Two additional cells were prepared as described in Example I, except that a lithium aluminum alloy (50 percent by weight) was used as the substrate foil. The following table presents the highest discharge capacity for each cell tested:

TABLE I

| Electrolyte | Discharge Capacity (mAh/g) | | | |
| --- | --- | --- | --- | --- |
| | Coated Anode | | Conventional Anode | |
| | Li | LiAl | Li | LiAl |
| $LClO_4$ in dioxolane | 967 | 884 | 492 | 178 |
| $LiAsF_6$ in MeTHF | 227 | 185 | | |

As demonstrated by these results, the coating of the present invention consistently and dramatically increases the capacity of the cells, irrespective of which electrolyte or anode composition is used.

EXAMPLE III

A comparison of rechargeable cells was made using a lithium anode prepared with a coating of the present invention and a conventional, uncoated lithium anode. Two cells were constructed identical to the cells described in Example I, except that $TiS_2$ was used instead of $FeS_2$ for the cathodic reactant. The following table presents the discharge capacity for the first three cycles of each cell:

TABLE II

| | Cycle Discharge Capacity mAh/g | | |
| --- | --- | --- | --- |
| | 1 | 2 | 3 |
| Coated Anode | 125.4 | 93.1 | 88.5 |
| Conventional Anode | 91.7 | 72 | |

These results demonstrate that the present invention improves the cycling efficiency of the cells. Nearly two-thirds of the initial cell capacity was rechargeable.

EXAMPLE IV

Comparative tests were made between cells using coated lithium anodes of the invention and conventional uncoated lithium anodes in an $SOCl_2$ electrolyte. One cell contained a coated lithium anode prepared in a manner described in Example I. The area and thickness of the foil was about 0.60 square inches and 0.10 inches, respectively. The thickness of the coating on the anode was about 1000 angstroms. A cathode for the cell was made with XC-72 carbon from the Cabot Corporation and 3% dry powdered teflon. The mix was pressed at about 1200 psi into a nickel grid with tabs for electrical contact. The cathode formed was then cured at 100° C. to bond the mix.

Filter paper was used as a separator in the cell. The electrolyte, 1.8M $LiAlCl_4$—$SOCl_2$ was obtained from the Lithium Corporation of America and added to the test cell.

A second cell was constructed in an identical manner as described above, except that the anode was a conventional uncoated lithium foil.

FIG. 3 compares the discharge of each cell at 20 mA. As the data clearly demonstrate, the voltage delay phenomena is eliminated by using the lithium anode coated with the present invention. This is accomplished with an improvement in operating voltage at the same drain rate.

EXAMPLE V

Lithium foil supplied by Foote Mineral (99.9% pure) reacted with 18% $SiF_4$ gas mixed with argon in a sealed glass container at slightly less than one atm. total pressure. At 125° C. the lithium foil immediately started reacting gently and turned black in color, forming a coating within about 5 minutes.

Figure 4:
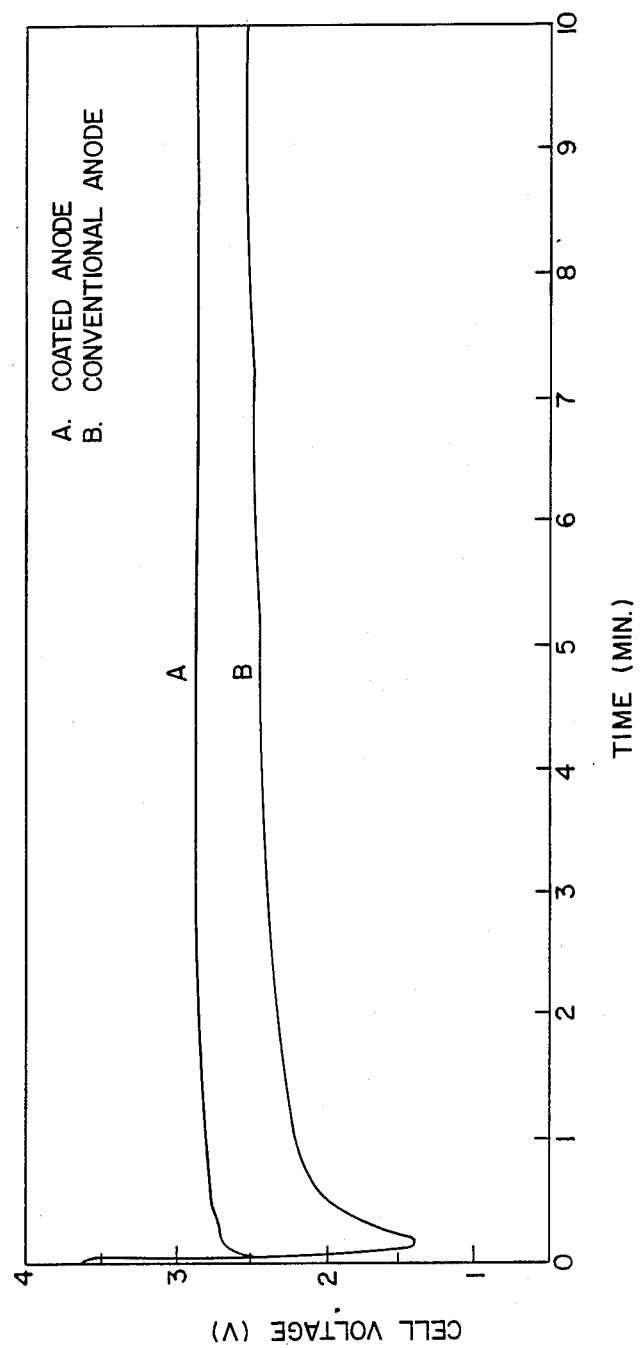
FIG. 4 is a discharge curve plotting cell voltage versus time for a coated lithium anode of the invention made by a reactive chemical vapor deposition technique compared to a conventional, uncoated anode of the prior art.

FIG. 4 compares the discharge at 20 mA of a conventional, uncoated lithium anode with the anode described above. The data illustrate the improved electrochemical performance of the cell having the inventive coating made by the reactive chemical vapor deposition technique.

Figure 5:
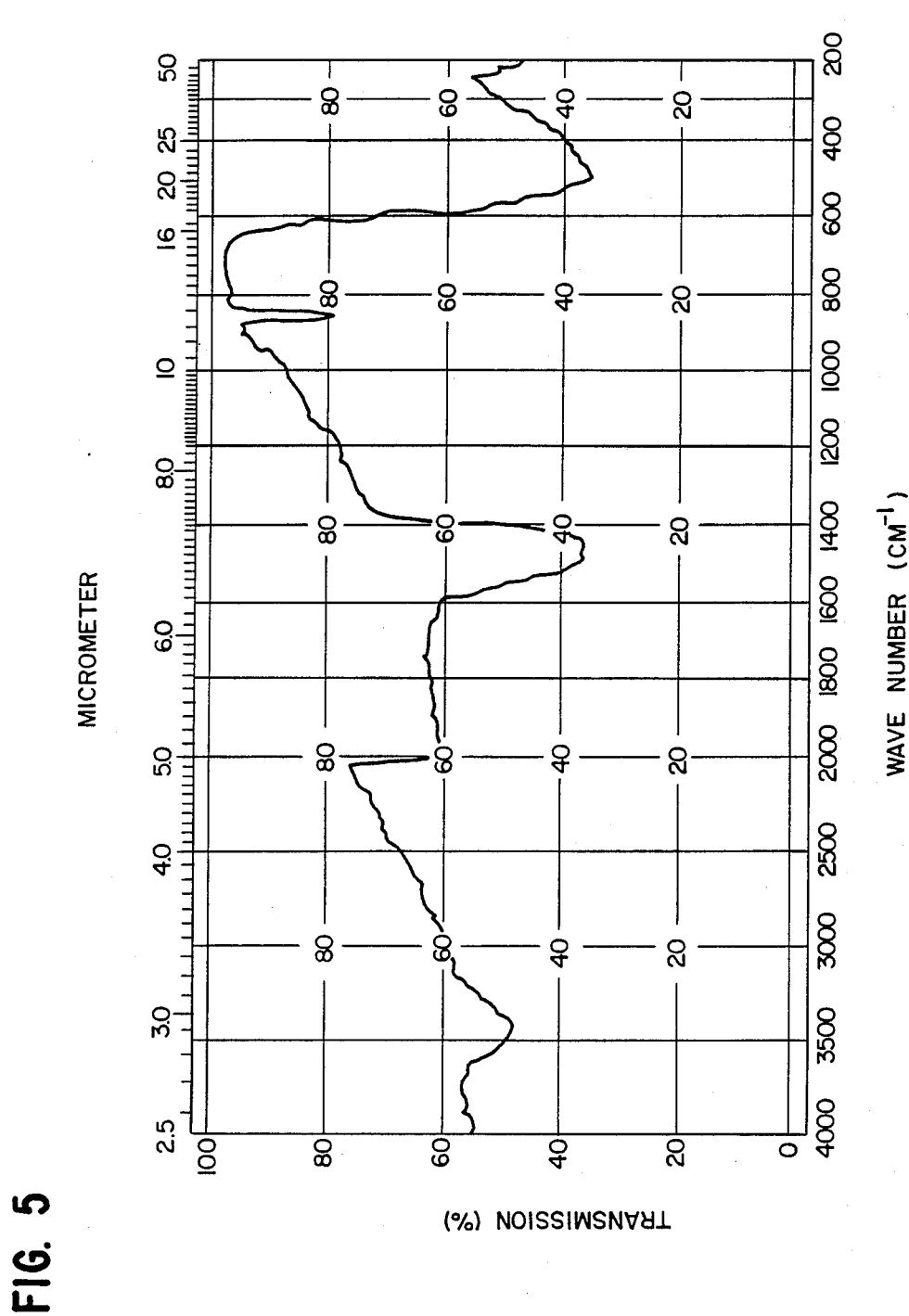
FIG. 5 presents the infrared spectrum for a coating of the present invention formed by the reaction of lithium metal and $SiF_4$.
Figure 6:
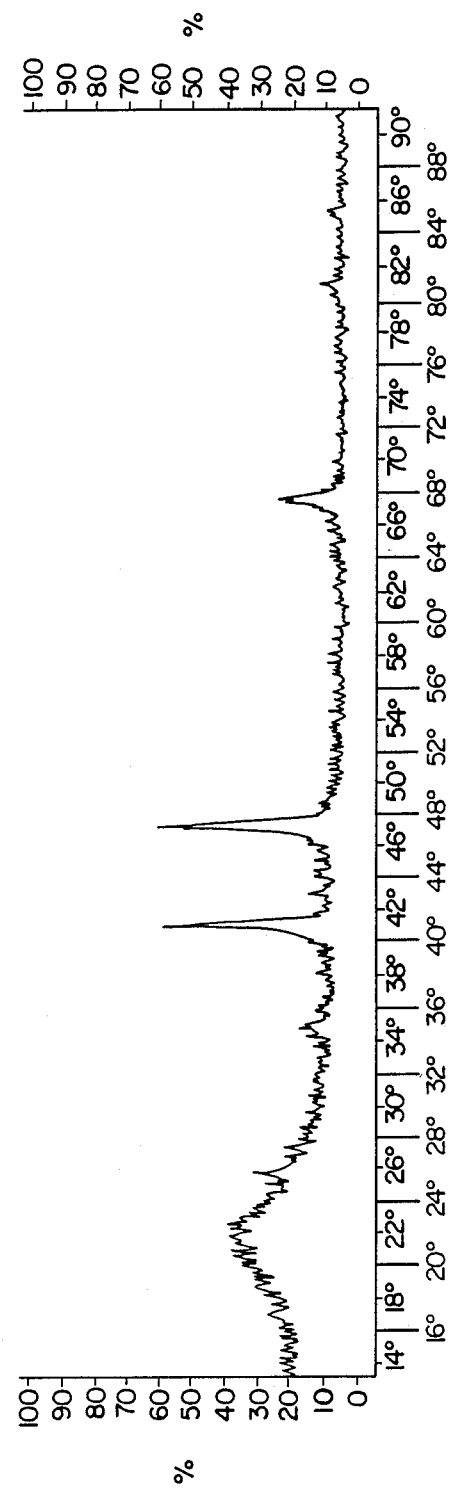
FIG. 6 presents the X-ray diffraction spectrum of a coating of the present invention formed by the reaction of lithium metal and $SiF_4$.

The infrared spectrum of the resultant coating appears as FIG. 5 and does not agree with the infrared spectra of $Li_2SiF_6$, $SiF_4$, and $Na_2SiF_6$ presented in the literature. The sample was prepared with finely ground KBr as a pressed pellet. The X-ray diffraction spectrum of the coating on a glass s substrate appears as FIG. 6 and does not agree with the X-ray diffraction spectra of the above-identified reference compounds found in the literature. The resultant coating was determined to be $Li_4SiF_4$.

EXAMPLE VI

Comparative tests were made between Li-$SOCl_2$ electrochemical cells using anodes of
(1) uncoated lithium,
(2) lithium coated with a cyanoacrylate polymer, and
(3) lithium having a composite coating of an activated species layer of an inorganic coating containing lithium, silicon and fluorine and a similar cyanoacrylate polymer layer over the active species coating.

An uncoated lithium anode (surface area 30 $cm^2$) was swaged in a C size can and was chemically reacted at 130° C. with $34.236 \times 10^{-5}$ moles of $SiF_4$ at a total pressure of 400 Torr with helium to form an inorganic active species coating comprising lithium, fluorine and silicon.

One of the lithium anodes having no coating was used with a cyanoacrylate polymer according to published procedures in U.S. Pat. No. 4,170,693 to Catanzarite. Pacer Tech cyanoacrylate was diluted 1:5 by volume in dimethoxyethane or ethylacetate. The lithium anode was twice dipped for 15 seconds and allowed to dry in an argon atmosphere.

Cells were assembled having the different anodes, and were otherwise similar. The three different types of anodes chosen were
1. uncoated lithium;
2. lithium coated with a cyanoacrylate polymer; and
3. lithium having a composite coating of an activated species layer and an overlayer of the cyanoacrylate polymer.

Figure 8:
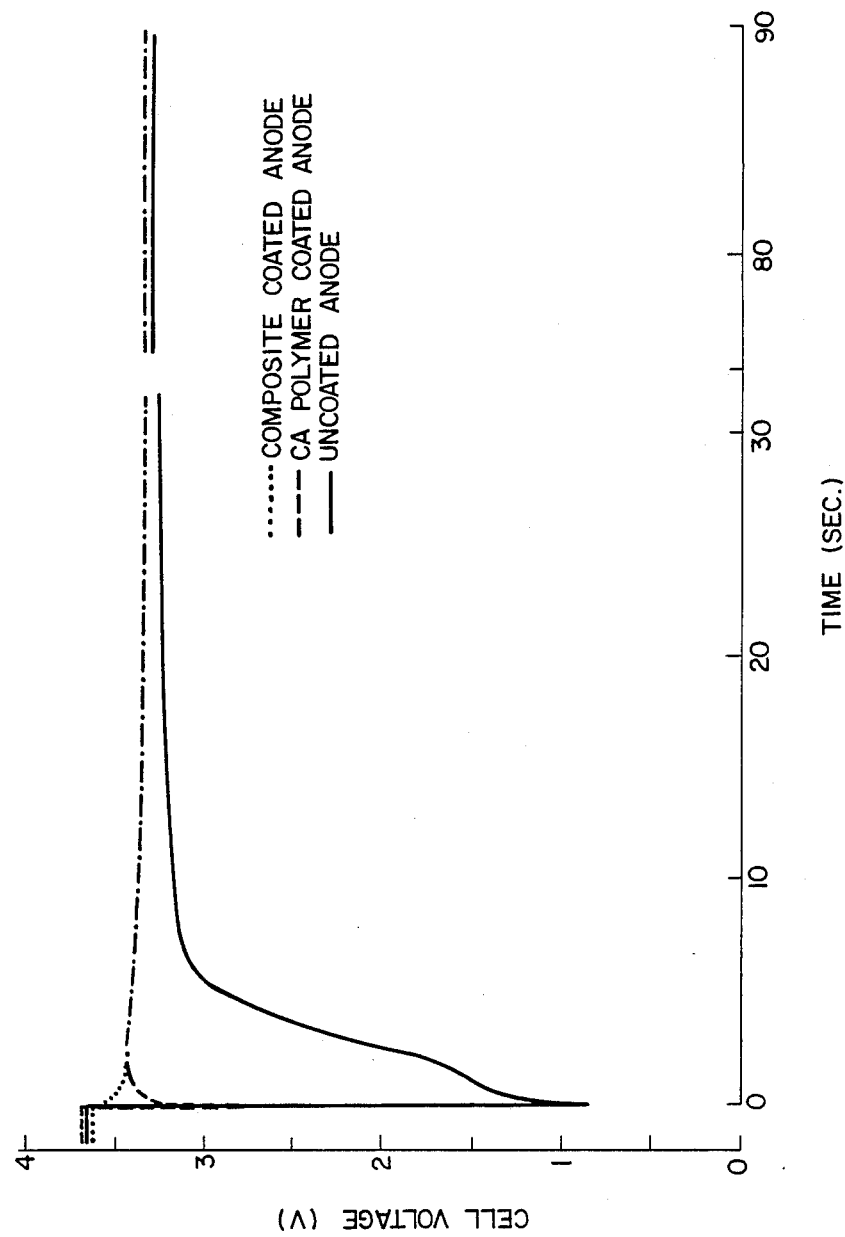
FIG. 8 is a graph of cell running voltage versus time for a composite coated lithium anode of the invention compared to an uncoated lithium anode and a cyanoacrylate coated lithium anode, after storage for two weeks.

One set of three cells with each kind of anode was stored at room temperature for two weeks prior to testing at room temperature. FIG. 8 compares the initial discharge of each of the cells at 100 mA. These data clearly demonstrate the performance improvements in reducing voltage delay of the composite coated anode compared to the uncoated anode and the cyanoacrylate coated anode. The relative improvements in voltage delay can be calculated by taking the difference in voltage dips (voltage dip is a difference between running voltage and the minimum voltage) for coated and uncoated anode cells and dividing by the voltage dip of the uncoated cell. In the above case, the cell having an anode coated with a composite coating shows a 100 percent improvement in voltage delay versus the reference cell, whereas the cyanoacrylate coated anode cell shows a voltage delay improvement of about 79%.

Figure 7:
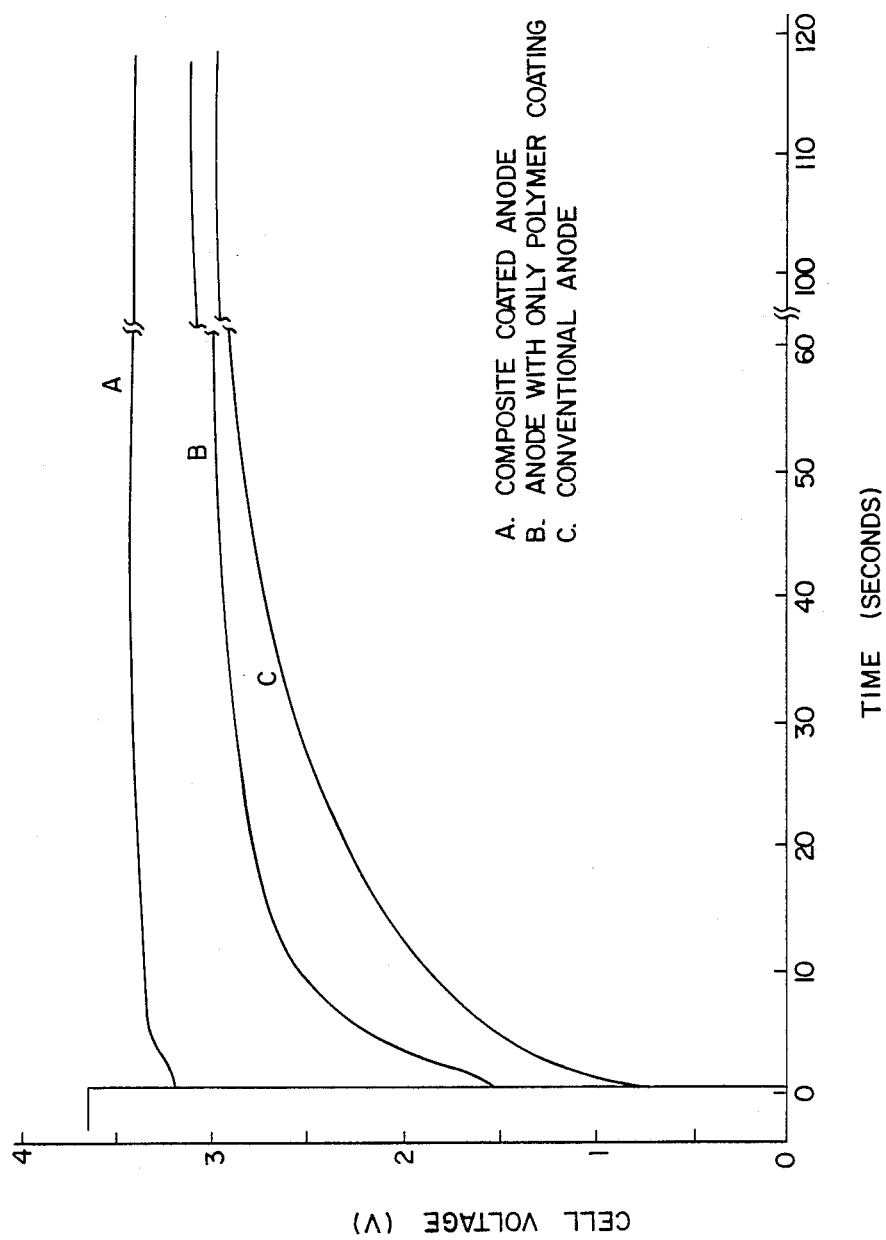
FIG. 7 is a graph of cell running voltage versus cell discharge for a cell having a composite coated anode of the invention compared to an anode having only a polymer coating and to a conventional uncoated anode of the prior art.

After testing the voltage delay, the cells were allowed to discharge at a constant current of 60 mA up to a 2.5 volt cutoff. The discharge capacity of the cell having the composite coated anode is 4.30 AH, which is significantly higher than the 3.94 and 3.17 AH, respectively, for the cell with the uncoated lithium anode and the cell with only the cyanoacrylate coated anode. FIG. 7 illustrates cell running voltage versus cell discharge for a cell having the composite coated anode compared to the uncoated anode and the polymer coated anode.

Figure 9:
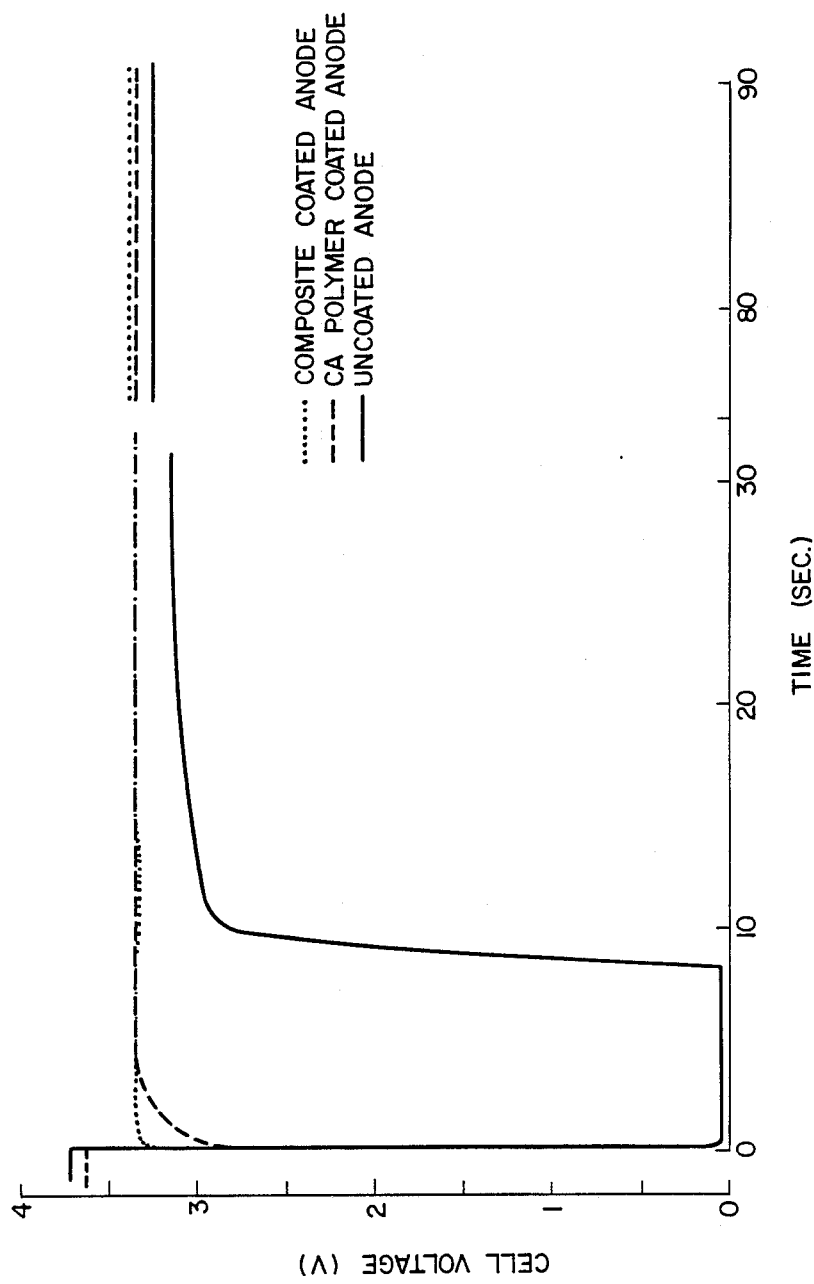
FIG. 9 is a graph of cell running voltage versus time for a composite coated lithium anode of the invention compared to an uncoated lithium anode and a cyanoacrylate coated lithium anode after storage for two weeks at room temperature and storage for one week at 50° C. prior to testing at room temperature.

A second set of cells having the three types of anodes as previously described were stored for two weeks at room temperature and one week at 50° C. prior to testing at room temperature at 60 mA. FIG. 9 clearly shows the performance improvements in reducing voltage delay of the composite coated anode compared to the uncoated anode and the polymer coated anode.

Upon discharge at a constant current of 60 mA up to a voltage cutoff of 2.5 volts, the composite coated lithium anode cell delivered 4.7 AH capacity, about 65% higher than the capacity obtained with the polymer coated cell.

Figure 10:
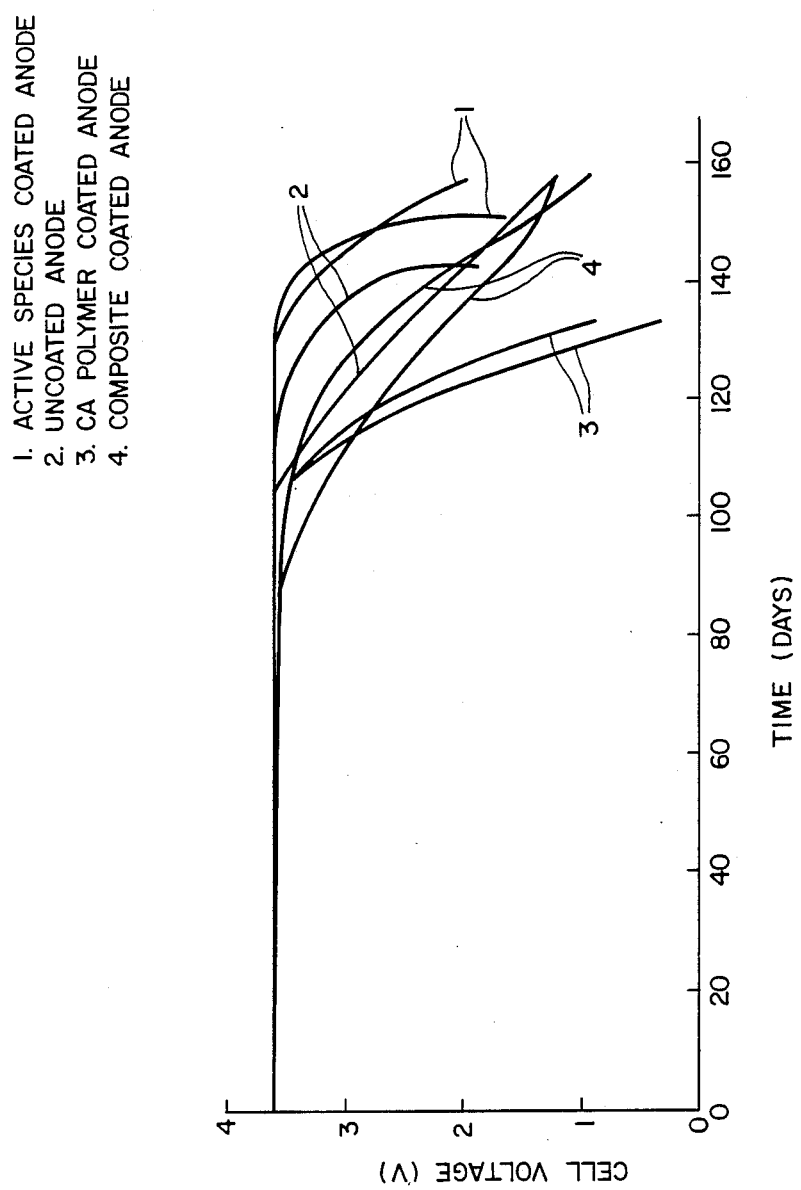
FIG. 10 is a graph of cell voltage versus time at a constant drain rate of 65 micro $A/cm^2$ for a composite coated anode of the invention compared to an active species coated anode, an uncoated anode and a cyanoacrylate coated anode.

A third set of cells was discharged under constant load corresponding to 65 micro-A/cm$^2$ drain rate and the discharge curves for the different anodes are shown in FIG. 10. It may be noted that at low rates, the composite coated anodes also deliver the capacity equal to that of uncoated anodes, whereas a loss of capacity is realized with the polymer coated anode.

With the anode coated only with cyanoacrylate, a decline in capacity is consistently observed The cyanoacrylate polymer dissolves in thionyl chloride and this was confirmed by weight loss observation of cyanoacrylate polymer coatings in inert substrates on standing in 1.0M LiAlCl$_4$/SOCl$_2$ electrolyte. Dissolution of the cyanoacrylate polymer in thionyl chloride was further confirmed by IR spectroscopy. No theory for this loss of capacity has been proven, although it is possible that the addition of the dissolved polymer to the electrolyte adversely affects its impedance at the latter stages of discharge.

EXAMPLE VII

Comparative tests were made between Li—SOCl$_2$ cells using anodes of uncoated lithium, lithium coated with a vinyl polymer and lithium having a composite coating of an activated species layer and a similar vinyl polymer overlayer.

An uncoated lithium anode (surface area 6.45 cm$^2$) was chemically reacted at 130° C. with 6.85×10 moles of SiF$_4$ at a total pressure of 600 Torr with helium to form an active species coating composed of lithium, fluorine and silicon.

One of the lithium anodes having no coating was used with a vinyl polymer according to the teachings of U.S. Pat. No. 3,993,501 to Kalnoki-Kis. Vinyl polymer VYHH (86% vinyl chloride, 14% vinyl acetate) was obtained from Union Carbide. The vinyl polymer (0.82 gms) was dissolved in 10 cc of thionyl chloride (approximately 5 weight percent of SOCl$_2$) and the lithium anode was immersed in the solution for one minute and allowed to dry.

Cells were assembled having different anodes and were otherwise similar. The three different anodes were:
(1) uncoated lithium;
(2) lithium coated with a vinyl polymer; and
(3) lithium having a composite coating of an activated species layer and a similar vinyl polymer overlayer.

Figure 11:
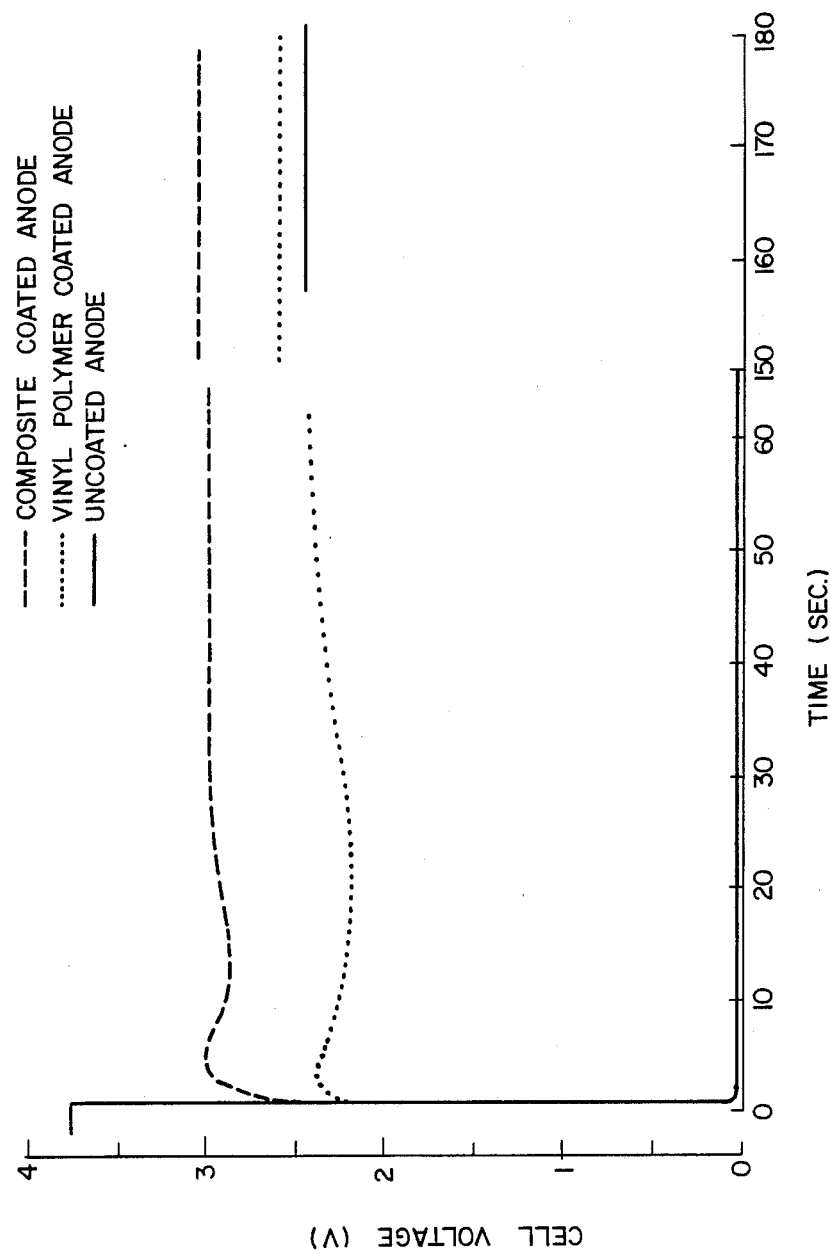
FIG. 11 is a graph of cell voltage versus time for a composite coated anode of the invention including a vinyl polymer layer compared to a vinyl polymer coated anode and an uncoated anode, tested at 20 mA after four days of storage.

The cells were stored at room temperature for four days prior to testing at 20 mA. FIG. 11 demonstrates the performance improvements in reducing voltage delay of the composite coated anode compared to the uncoated anode and the vinyl polymer coated anode.

Like the cyanoacrylate polymer discussed in Example VI, the vinyl polymer was also found to be soluble in 1.8M LiAlCl$_4$/SOCl$_2$, by weight loss analysis and by IR spectroscopy.

EXAMPLE VIII

Comparative tests were made between Li—SOCl$_2$ electrochemical cells using anodes of uncoated lithium, lithium coated with a silicone polymer and lithium having a composite coating of an activated species coating and a similar silicon polymer overlayer.

The activated species coating was made as in Example IX.

The silicone polymer coating was made by using polycyanopropylmethyl siloxane (PS906) obtained from Petrarch Systems, Inc. which was diluted 1:2 by volume in ethyl acetate. The lithium anode was dipped twice for 20 seconds and dried.

Cells were assembled having the 6.5 cm$^2$ anodes which differed as described hereafter:
(1) uncoated lithium pressed on both sides of a nickel screen (exmet), referred to as lithium exmet;
(2) lithium exmet coated with silicone polymer; and
(3) lithium exmet having a composite coating of an activated species layer and a silicone polymer layer.

The three cells were stored for one day at room temperature prior to testing at a 40 mA drain rate, also at room temperature.

Figure 12:
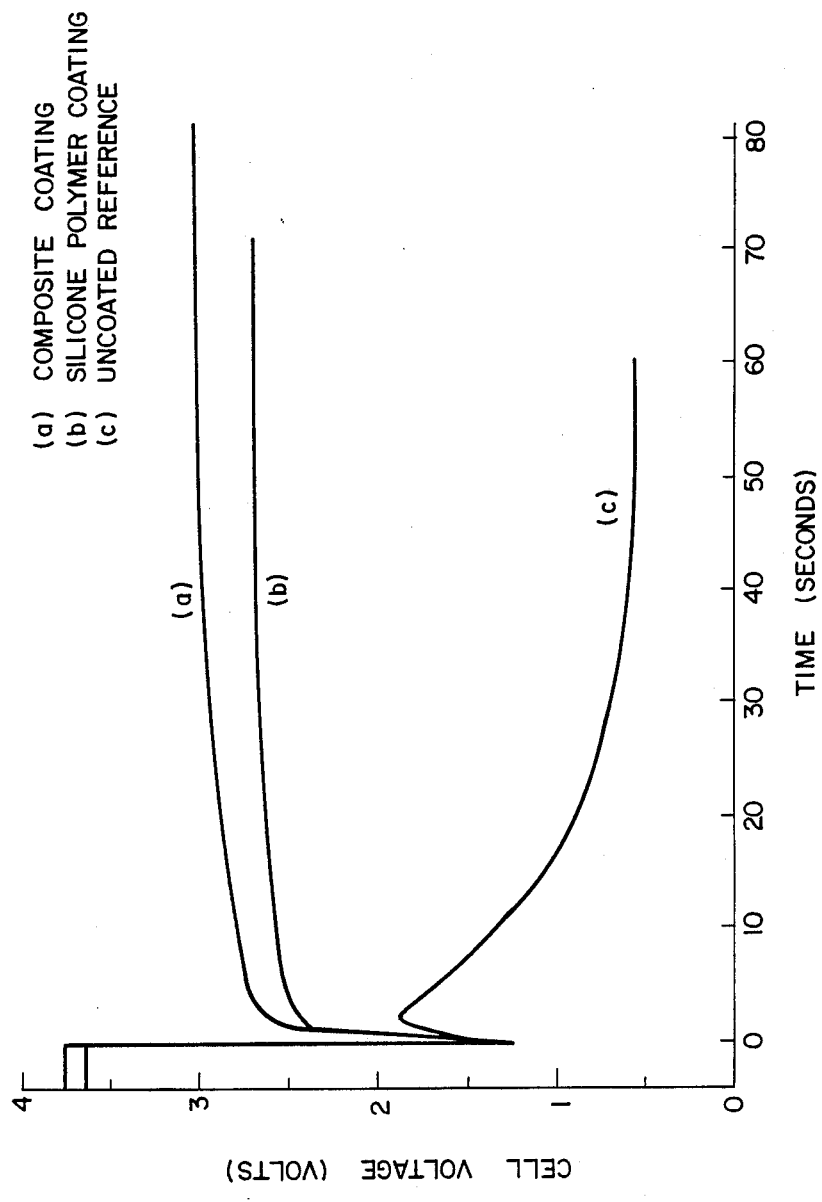
FIG. 12 is a graph of cell voltage versus time for a composite coated anode of the invention including a silicone polymer layer compared to a silicone polymer coated anode and an uncoated anode.

FIG. 12 illustrates the performance improvements in reducing voltage delay of the composite coated anode compared to the uncoated anode and the polymer coated anode.

Weight loss and IR spectroscopy analysis confirmed that the silicone polymer also dissolves in SOCl$_2$.

EXAMPLE IX

Comparative tests were made between Li—SOCl$_2$ electrochemical cells using anodes of uncoated lithium, lithium coated with a parylene polymer and lithium having a composite coating of an active species coating and a similar parylene overlayer.

The chemical resistance of parylene was tested by exposing a preweighed piece of N-parylene to 1.8M LiAlCl$_4$/SOCl$_2$ for 45 days. The sample did not show any weight loss nor any changes in IR spectroscopy analysis.

The lithium anodes were coated as follows. A lithium anode was loaded, under argon atmosphere, into a glass reactor having valves on two ends, one end of which was connected to a quick connect T attached to a ⅜ inch diameter stainless steel tube resting in a muffle furnace. The other end of the reactor and the other side of the quick connect T having a valve are connected to a mechanical vacuum pump. A quantity of 2,2'-paracyclophane was loaded in a stainless steel gasketed end cap and was attached to the other end of the stainless steel tube. Thermocouples were placed near the sample mount and at the center of the furnace. The system was pumped to 10 millitorr pressure, first bypassing the lithium containing reactor and later through the reactor. The furnace was heated to 675° C. and then the paracyclophane sample was heated to 260° C. to achieve polymer deposition on the lithium anodes. IR spectroscopy of the polymer produced was identical to that of a known n-parylene polymer sample.

The coating of an active species was made as in Example II on a lithium anode. The active species coated anode and the uncoated lithium anode of the same dimension (6.5 cm$^2$) were used for deposition of parylene polymer using the same procedure as previously described.

Figure 13:
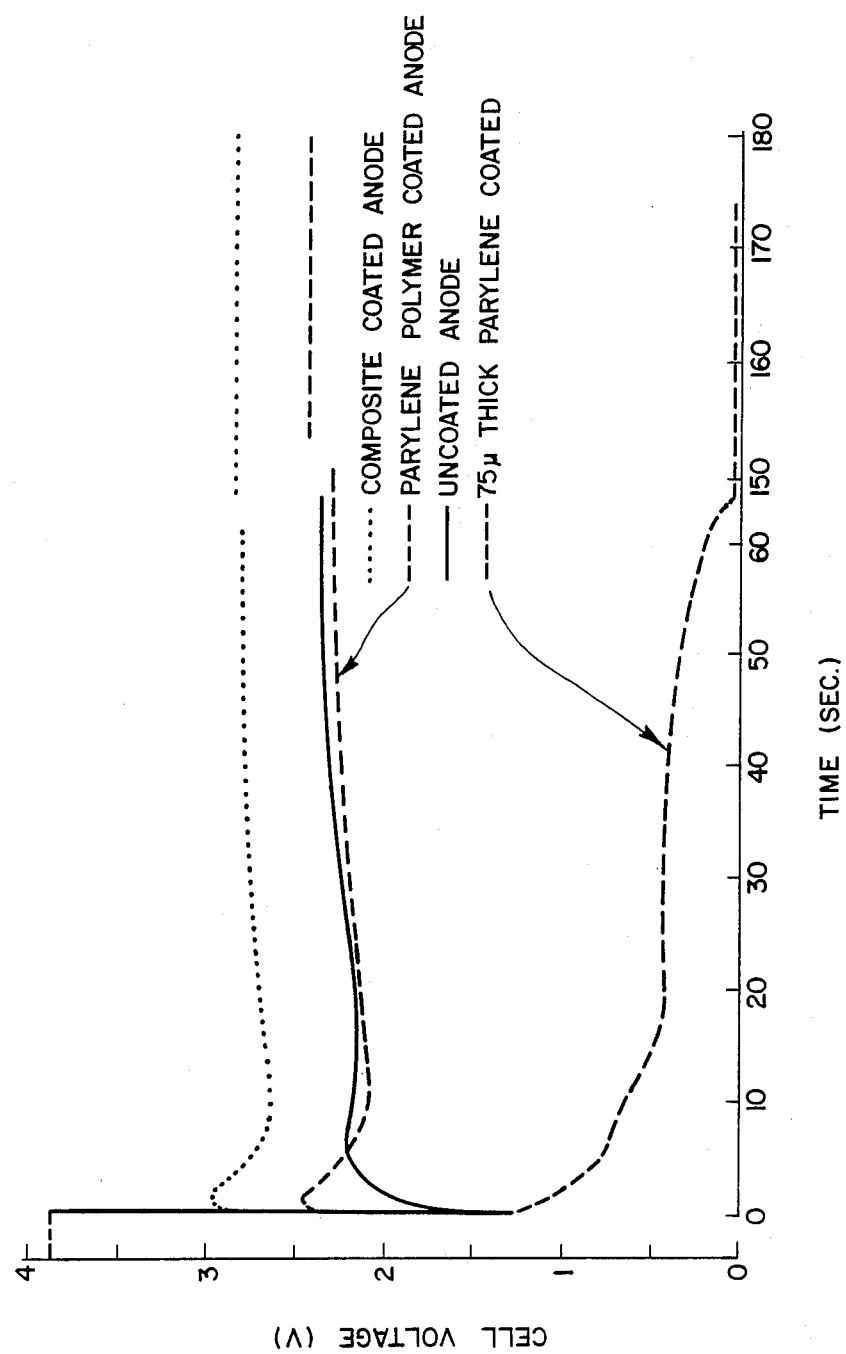
FIG. 13 is a graph of cell voltage versus time for a composite coated anode of the invention including a parylene polymer layer compared to a parylene polymer coated anode and an uncoated anode.

Cells were assembled having the different anodes and were otherwise similar. Comparative tests were made between Li—SOCl$_2$ cells using anodes of uncoated lithium, lithium coated with a parylene polymer and lithium having a composite coating of an activated species (as described in Example VII) and a similar parylene polymer overlayer. Cells were stored at room temperature for one day prior to testing at 40 mA. FIG. 13 shows the performance improvements in reducing the voltage delay of the composite coated anode and the parylene polymer coated anode. Since the parylene polymer does not dissolve in LiAlCl$_4$/SOCl$_2$ electrolyte, the thickness of the polymer can be critical. It has been observed that a greater than 5 micrometer thick parylene polymer coated anode does not function, as illustrated in FIG. 13.

EXAMPLE X

Du Pont's Nafion ® membrane polymer was observed to be insoluble in SOCl$_2$.

One gram of Nafion ® powder (trade designation 1100 EW) from Du Pont was contacted with 20 cc of dry dimethylformamide for two days inside a glove box. The solution was then decanted and one of the uncoated lithium anodes was dipped twice for 20 seconds and allowed to dry to form a Nafion ® polymer coating.

The active species coating was applied to another lithium anode as described in Example VI and thereafter coated with the Nafion ® polymer coating as described herein to obtain a composite coating.

Three similar Li-SOCl$_2$ cells were assembled except for the different lithium anodes. The three different anodes were of:
 (1) uncoated lithium;
 (2) lithium coated with Nafion ® polymer; and
 (3) lithium having a composite coating of an active species layer and a Nafion ® polymer layer.

The cells were stored at room temperature for four days and tested at 20 mA.

FIG. 14 shows the performance improvements in reducing voltage delay of the composite coated anode compared to the uncoated anode and the polymer coated anode.

As illustrated by these examples, a number of advantages result from substituting a designed coating for the passivating layer otherwise formed on electrodes. The coatings of the invention allow for diffusion of the active species through the coating to the electrolyte upon electrochemical release of the active species from the electrode. Simultaneously, the coating provides a substantially impervious barrier to the electrolyte. Because the electrolyte can neither diffuse through the coating nor degrade the coating to come in direct contact with the electrode, a passivation layer is not formed directly on the electrode. The phenomenon of voltage delay is completely eliminated without deleterious consequences to the electrochemical performance of the cell. In fact, the electrochemical cells described herein exhibit a wide operating temperature range with improved cell capacity at various discharge rates.

Improved rate capability for several cathodic reactants has also been achieved by the invention. Improved cell voltage and capacity demonstrate greater electrochemical efficiency with a concomitant reduction in internal heat generation. Furthermore, the coatings provide long shelf lives for the electrodes because they are protected against degradation by the electrolyte.

Secondary cells embodying the inventive concept described herein demonstrate an improved rechargeability and decreased dendrite formation. The invention avoids excessive solvent degradation. Consequently, less gassing was observed during cycling of the cells. This provides a safer environment because the cells are less prone to rupture because of pressure buildup. All of the advantages described herein have been achieved without rigorous purification of the electrolyte. Thus, cells produced in accordance with the invention are less expensive and easier to manufacture.

Modifications and variations of the present invention are possible in light of the above teachings. It is, therefore, to be understood that within the scope of the appended claims the invention may be practiced otherwise than as specifically described.

We claim:
 1. The chemical compound Li$_4$SiF$_4$.
 2. A composition of matter comprising the elements lithium, fluorine, and silicon; exhibiting characteristic absorption bands in the infrared region of the spectrum at the frequencies expressed in reciprocal centimeters according to FIG. 5 and the X-ray diffraction pattern according to FIG. 6.
 3. A composition of matter prepared by exposing lithium metal to a gaseous mixture of 18% SiF$_4$ in argon at one atmosphere and at a temperature of 125° C.
 4. A compound Li$_x$MF$_x$, wherein M is an atmosphere element and selected from the group consisting of As, Ge, Mo, P, Sb, Si and W and x is an integer from 3 to 6 corresponding to a valence of said amphoteric element M.

* * * * *